(12) United States Patent
Wang et al.

(10) Patent No.: US 10,914,107 B2
(45) Date of Patent: Feb. 9, 2021

(54) SLIDING DOOR ASSEMBLY AND GROUND BASE STATION USING THE SAME

(71) Applicant: SZ DJI TECHNOLOGY CO., LTD., Shenzhen (CN)

(72) Inventors: Mingxi Wang, Shenzhen (CN); Xiangyu Chen, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 446 days.

(21) Appl. No.: 15/792,505

(22) Filed: Oct. 24, 2017

(65) Prior Publication Data

US 2018/0044959 A1 Feb. 15, 2018

Related U.S. Application Data

(63) Continuation of application No. PCT/CN2015/077561, filed on Apr. 27, 2015.

(51) Int. Cl.
*E05D 15/06* (2006.01)
*E06B 3/42* (2006.01)
(Continued)

(52) U.S. Cl.
CPC ............ *E05D 15/0621* (2013.01); *B64F 1/00* (2013.01); *E05F 15/00* (2013.01); *E06B 3/42* (2013.01); *E06B 5/00* (2013.01); *B64C 2201/20* (2013.01); *E05F 15/635* (2015.01); *E05Y 2900/60* (2013.01)

(58) Field of Classification Search
CPC .... B64F 1/22; B64F 1/222; B64F 1/32; B64F 1/36; B64F 1/00; B64C 39/024; B64C 2201/20; B64C 2201/18; E01F 3/00; B60S 5/06; H02J 7/0045; E05Y 2900/60; E05F 15/00; E05F 15/635; E06B 5/00; E06B 3/42; E05D 15/0621
USPC .......... 244/100 R, 114 R, 110 E, 114 B, 115, 244/116; 114/261, 258, 259, 260, 262, 114/263
See application file for complete search history.

(56) References Cited

U.S. PATENT DOCUMENTS 4,637,446 A * 1/1987 McQueen ............. E05D 15/262
160/207
9,284,062 B2 * 3/2016 Wang ........................ B64F 1/20
(Continued)

FOREIGN PATENT DOCUMENTS

CN 102774505 A 11/2012
CN 203681880 U 7/2014
(Continued)

OTHER PUBLICATIONS

Machine translation of foreign reference JP2015042539, obtained from https://www.j-platpat.inpit.go.jp/p0200 (last accessed on Jul. 1, 2020) (Year: 2020).*
(Continued)

*Primary Examiner* — Theodore V Adamos
(74) *Attorney, Agent, or Firm* — Anova Law Group, PLLC

(57) ABSTRACT

A sliding door assembly includes a landing platform located in a first plane, a sliding door mating with the landing platform and located in a second plane approximately parallel to the first plane, and a driving assembly configured to drive the sliding door to move translationally in the second plane to open or close the sliding door.

16 Claims, 3 Drawing Sheets

(51) Int. Cl.
  *E06B 5/00* (2006.01)
  *B64F 1/00* (2006.01)
  *E05F 15/00* (2015.01)
  *E05F 15/635* (2015.01)

(56) References Cited

U.S. PATENT DOCUMENTS

| | | | |
|---|---|---|---|
| 10,467,685 B1* | 11/2019 | Brisson | B64F 1/222 |
| 2007/0051048 A1 | 3/2007 | Krohn et al. | |
| 2010/0024308 A1* | 2/2010 | Coubray | E05F 15/67 |
| | | | 49/362 |
| 2014/0124621 A1 | 5/2014 | Godzdanker et al. | |
| 2015/0183528 A1* | 7/2015 | Walsh | B64F 1/32 |
| | | | 701/3 |
| 2016/0009413 A1* | 1/2016 | Lee | B64F 1/007 |
| | | | 701/16 |
| 2016/0039300 A1* | 2/2016 | Wang | B60L 11/1822 |
| | | | 244/39 |
| 2016/0039537 A1* | 2/2016 | Vasapollo | B64F 1/222 |
| | | | 244/114 R |
| 2016/0101874 A1* | 4/2016 | McKinnon | B64F 1/007 |
| | | | 244/114 R |
| 2017/0021942 A1* | 1/2017 | Fisher | B64C 29/02 |
| 2017/0023949 A1* | 1/2017 | Fisher | B64C 29/02 |
| 2017/0129464 A1* | 5/2017 | Wang | B64C 39/024 |
| 2017/0175413 A1* | 6/2017 | Curlander | E04H 14/00 |
| 2017/0253349 A1* | 9/2017 | Wang | B64F 1/02 |
| 2019/0002127 A1* | 1/2019 | Straus | G08G 5/0091 |
| 2019/0002128 A1* | 1/2019 | Raz | G05D 3/10 |
| 2019/0100330 A1* | 4/2019 | Cheng | B64F 1/007 |
| 2019/0168888 A1* | 6/2019 | Kim | B64F 1/12 |
| 2019/0217971 A1* | 7/2019 | Comerford | A47G 29/141 |

FOREIGN PATENT DOCUMENTS

| | | | | |
|---|---|---|---|---|
| EP | 2799336 A1 | | 11/2014 | |
| JP | H03169983 A | | 7/1991 | |
| JP | 2015042539 A | * | 3/2015 | |
| WO | 3323287 A1 | | 11/1993 | |
| WO | WO-2014170834 A1 | * | 10/2014 | B64F 1/222 |
| WO | WO-2015026018 A1 | * | 2/2015 | G08G 5/0013 |

OTHER PUBLICATIONS

The World Intellectual Property Organization (WIPO) International Search Report for PCT/CN2015/077561 dated Feb. 2, 2016 6 Pages.

* cited by examiner

SLIDING DOOR ASSEMBLY AND GROUND BASE STATION USING THE SAME

CROSS-REFERENCE TO RELATED APPLICATION

This is a continuation application of International Application No. PCT/CN2015/077561, filed on Apr. 27, 2015, the entire contents of which are incorporated herein by reference.

TECHNICAL FIELD

The present disclosure relates to a base station apparatus that assists an unmanned aerial vehicle in stopping on the ground, and in particular, to a sliding door assembly and a ground base station using the same.

BACKGROUND

With the development of the unmanned aerial vehicle industry, some existing base station apparatuses providing ground assisted landing interact with hardware of an unmanned aerial vehicle to open and close a door, mainly in the form of large chamfering positioning, flat-opened swing door and the like. In the existing flat-opened door design by pushing from the bottom up, the door returns by virtue of an elastic structure after the door is pushed to open flat.

The existing design scheme of a sliding door manner, due to the limitation of the door opening manner, does not require a power source, but requires the base station and a middle position of the unmanned aerial vehicle to keep a certain flat-opened distance. That is, a lower portion of the unmanned aerial vehicle needs to maintain a certain space to keep away from a sliding door. At the same time, a mechanism having a function of pushing from the bottom up is also required. Space requirements of the whole door part and design load of other parts are increased.

SUMMARY OF THE DISCLOSURE

In view of this, the present disclosure provides a sliding door assembly that reduces a distance required between it and an unmanned aerial vehicle and a ground base station using the same.

Provided is a sliding door assembly including a landing platform, a sliding door mating with the landing platform for opening or closing, and a driving assembly that drives the sliding door to move, wherein the landing platform and the sliding door are located in two planes approximately parallel to each other, and the driving assembly drives the sliding door to translate in the plane where the sliding door is located to open or close the sliding door.

Also provided is a sliding door assembly including a landing platform, a sliding door mating with the landing platform for opening or closing, and a driving assembly that drives the sliding door to move, wherein the driving assembly includes a power source, a gear, and a rack, the power source and the gear are installed on the landing platform, the rack is installed on the sliding door, the power source drives the gear to rotate, and the gear drives the sliding door to translate along a direction of extension of the rack through meshing transmission with the rack to open or close the sliding door.

A ground base station providing landing for an unmanned aerial vehicle includes a sliding door assembly installed thereon, and the sliding door assembly includes a landing platform, a sliding door mating with the landing platform for opening or closing, and a driving assembly that drives the sliding door to move, wherein the landing platform and the sliding door are located in two planes approximately parallel to each other, and the driving assembly drives the sliding door to translate in the plane where the sliding door is located to open or close the sliding door.

A ground base station providing landing for an unmanned aerial vehicle includes a sliding door assembly installed thereon, and the sliding door assembly includes a landing platform, a sliding door mating with the landing platform for opening or closing, and a driving assembly that drives the sliding door to move, wherein the driving assembly includes a power source, a gear, and a rack, the power source and the gear are installed on the landing platform, the rack is installed on the sliding door, the power source drives the gear to rotate, and the gear drives the sliding door to translate along a direction of extension of the rack through meshing transmission with the rack to open or close the sliding door.

In an implementation mode of the present disclosure, as the landing platform and the sliding door are located in two planes parallel to each other, the sliding door translates along the plane where it is located. By means of the sliding door, when the unmanned aerial vehicle needs to land to a base station to open the sliding door, a distance between the sliding door and the unmanned aerial vehicle is small, and the manner in which the sliding door is opened by translating in the plane is easy to use, so as to reduce the space occupied by the sliding door assembly as much as possible without occupying more space in the landing platform, reserve more design space for other auxiliary apparatuses in the base station, and avoid causing spatial influences on upper and lower apparatuses of the sliding door of the base station, which can enable the lower portion of the unmanned aerial vehicle to have a higher mounting capability and reduce the thickness dimension of the part of the ground base station.

Further, in an embodiment, the driving assembly includes a power source, a gear, and a rack. The power source is connected with the gear. The gear meshes with the rack. One of the landing platform and the sliding door is provided with the power source and the gear, and the other one of the landing platform and the sliding door is provided with the rack.

In an embodiment, the power source is installed on the landing platform, and the rack is installed on one side of the sliding door.

In an embodiment, the gear is installed on the power source and located between the power source and the landing platform.

In an embodiment, the sliding door includes a first side and a second side which are opposite to each other. The power source is installed on an upper end of the first side of the sliding door, and the rack is installed on the first side of the sliding door.

In an embodiment, the sliding door assembly further includes a sliding assembly to assist the sliding door to undergo a translational motion.

In an embodiment, the sliding assembly includes several bearings which are installed to a side portion of the sliding door.

In an embodiment, the landing platform of the sliding door assembly is provided thereon with a first sliding slot to receive the bearings and to limit and guide sliding of the bearings in the first sliding slot.

In an embodiment, the sliding door assembly further includes two cover plates covering a side portion of the sliding door.

In an embodiment, the bearings are installed to two ends of the first side of the sliding door and/or two ends of the second side of the sliding door.

In an embodiment, the landing platform of the sliding door assembly is provided thereon with a first sliding slot to receive the bearings and to limit and guide sliding of the bearings in the first sliding slot.

In an embodiment, the sliding door assembly further includes two cover plates which cover the first side and the second side of the sliding door respectively.

In an embodiment, the ground base station further includes a manipulator and a receiving cavity for receiving a battery or fuel.

In an embodiment, the manipulator is further provided thereon with a distance sensor which is used for sensing whether the sliding door in the sliding door assembly is opened to determine whether the sliding door assembly is in a normal state.

DESCRIPTION OF MAIN REFERENCE NUMERALS

TABLE 1

| | |
|---|---|
| Ground base station | 1 |
| Sliding door assembly | 100 |
| Receiving cavity | 200 |
| Manipulator | 300 |
| Landing platform | 10 |
| Opening | 12 |
| Sliding door | 20 |
| First side | 22 |
| Second side | 24 |
| Driving assembly | 30 |
| Power source | 32 |
| Gear | 34 |
| Rack | 36 |
| Sliding assembly | 40 |
| Bearing | 42 |
| First sliding slot | 44 |
| Cover plate | 50 |

Embodiments of the present disclosure is further described below in the DETAILED DESCRIPTION OF THE EMBODIMENTS in combination with the aforementioned accompanying drawings.

DETAILED DESCRIPTION OF THE EMBODIMENTS

Figure 1:
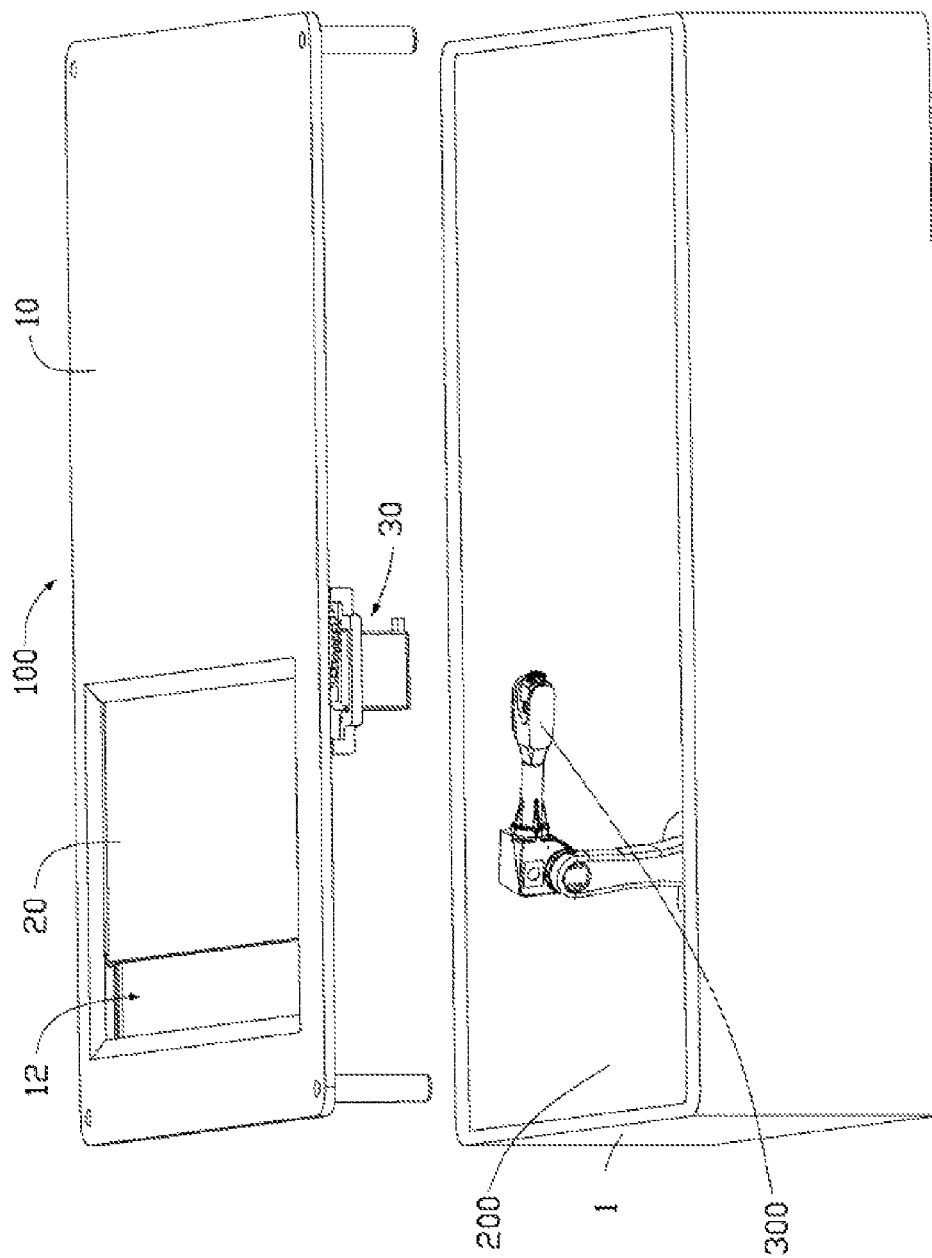
FIG. 1 is a schematic three-dimensional view illustrating that a sliding door assembly is split from a ground base station and inclined at an angle along the right side according to an implementation mode of the present disclosure.
Figure 2:
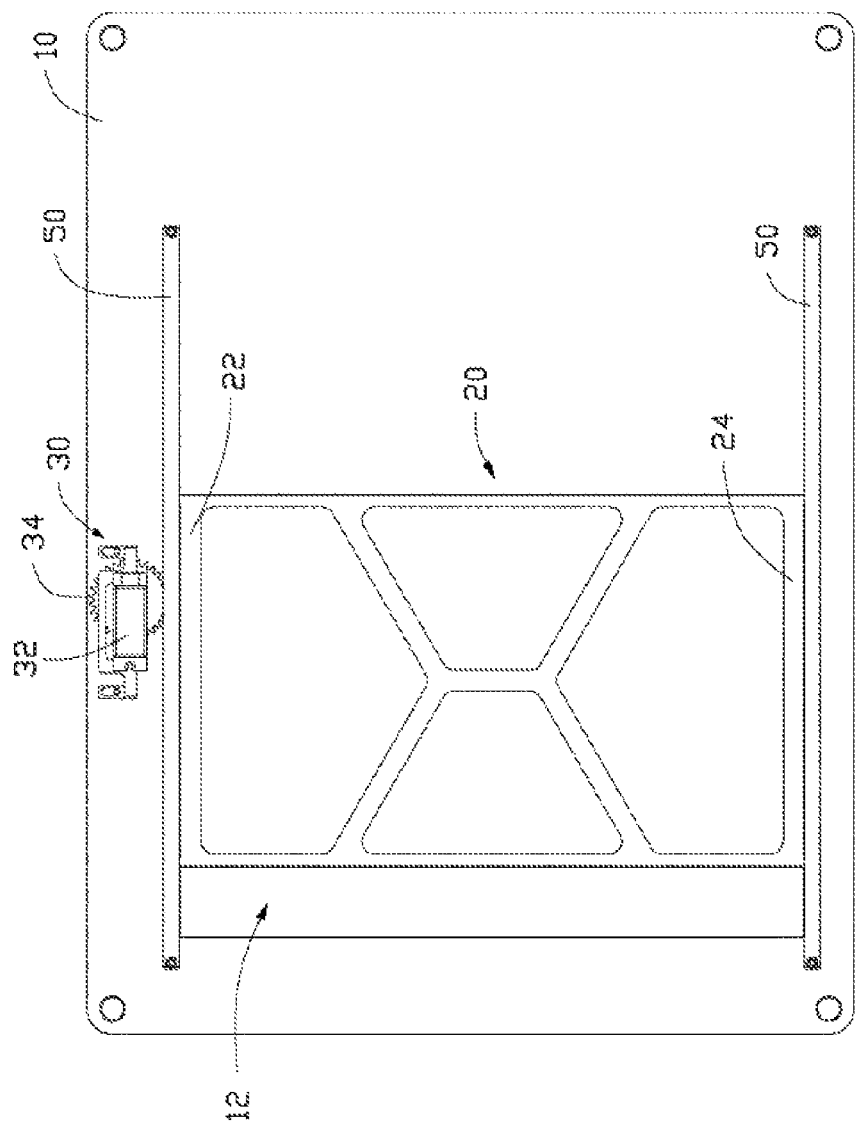
FIG. 2 is a schematic top view of the back of the sliding door assembly in FIG. 1.

Referring to FIG. 1 and FIG. 2, a ground base station 1 according to an implementation mode of the present disclosure is used for replacing energy or load for an unmanned aerial vehicle when the unmanned aerial vehicle lands to the ground base station. The energy may be a battery, fuel or the like, and the load may be an imaging device. The ground base station 1 includes a sliding door assembly 100, a receiving cavity 200 for receiving the battery or fuel, and a manipulator 300.

The sliding door assembly 100 includes a landing platform 10, a sliding door 20 mating with the landing platform 10 for opening or closing, and a driving assembly 30 that drives the sliding door 20 to move.

Both the landing platform 10 and the sliding door 20 may have a shape of a flat plate. The landing platform 10 is installed onto the ground base station, provides ground landing the unmanned aerial vehicle and provides a shelter for the battery or fuel stored in the ground base station 1 for the unmanned aerial vehicle. The landing platform 10 is provided thereon with an opening 12.

The sliding door 20 includes a first side 22 and a second side 24 which are opposite to each other. In this implementation mode, the sliding door 20 is approximately in a shape of a rectangle, whose shape and size are approximately equivalent to those of the opening 12 of the landing platform 10 respectively, and the first side 22 and the second side 24 are two opposite sides defining a width of the rectangle. In this implementation mode, the landing platform 10 and the sliding door 20 are located in two planes approximately parallel to each other. In the direction shown in FIG. 2, the first side 22 may be defined as an upper end, and the second side 24 as a lower end. The sliding door 20 is driven by the driving assembly 30, so as to enable the sliding door 20 to translate in the plane where it is located for opening or closing. When the sliding door 20 is opened, the opening 12 of the landing platform 10 is not blocked by the sliding door 20, and the manipulator 300 may fetch the battery and other supplies from the receiving cavity 200 and pass through the opening 12 to extend out of the ground base station 1 so as to replace the battery or the like for the unmanned aerial vehicle on the ground base station 1 to supply energy or load. When the sliding door 20 is closed, the opening 12 of the landing platform 10 is blocked by the sliding door 20, and the manipulator 300 is received in the receiving cavity 200 and cannot extend out.

Figure 3:
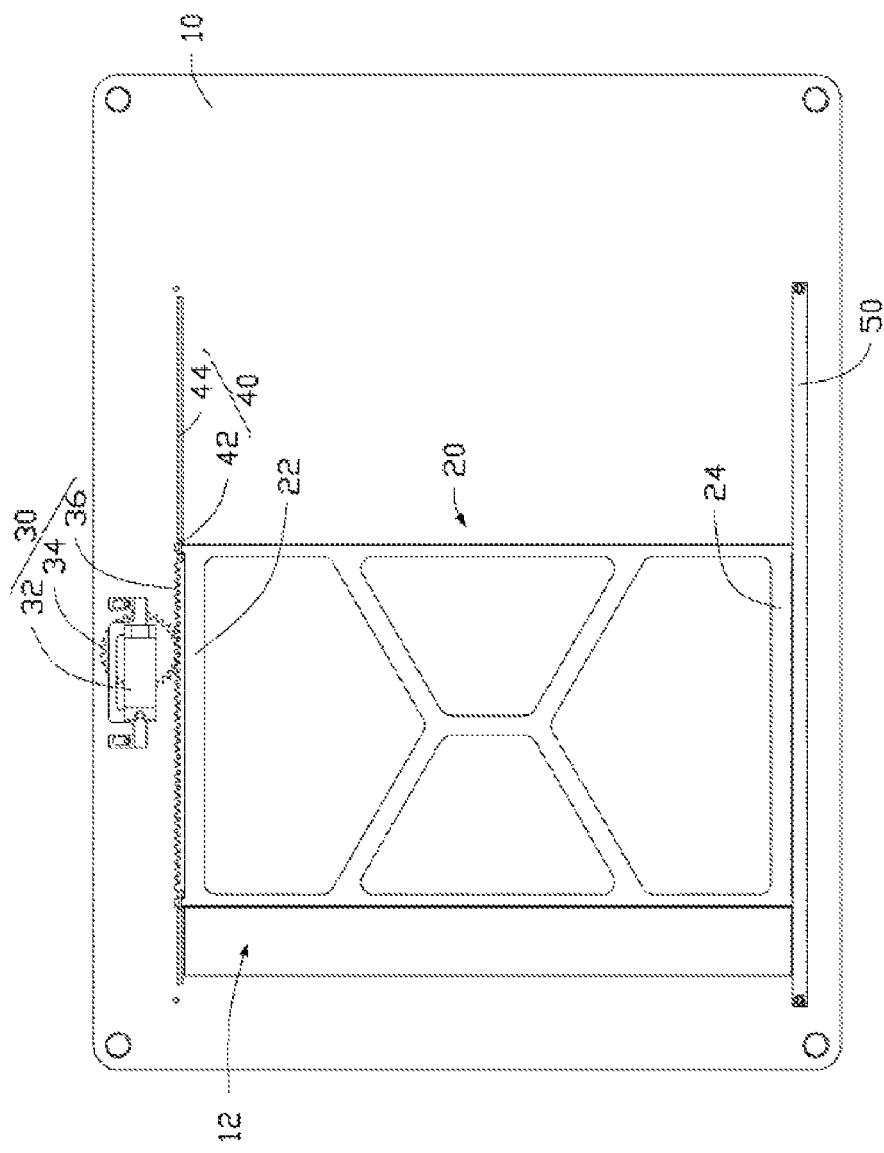
FIG. 3 is a schematic top view of removal of an upper end cover plate from the sliding door assembly in FIG. 2.

Referring to FIG. 3 at the same time, the driving assembly 30 may drive opening or closing of the sliding door 20. The driving assembly 30 includes a power source 32, a gear 34 driven by the power source 32, and a rack 36 mating with the gear 34. In this implementation mode, the power source 32 is installed on the landing platform 10. Further, the power source 32 is installed to an upper end (the direction shown in FIG. 2) of the opening 12 of the landing platform 10, that is, a position near the first side 22 of the sliding door 20. In this implementation mode, the power source 32 may be a steering gear. The gear 34 is connected to the power source 32, and the power source 32 directly drives the gear 34 to rotate. The rack 36 is installed to the first side 22 of the sliding door 20, and may mesh with the gear 34. In other implementation modes, the power source 32 and the gear 34 installed thereon may be installed on the sliding door 20 together, while the rack 36 is installed on the landing platform 10, which can also drive mutual transmission of the gear 34 and the rack 36 through the power source 32, and in turn, drive the translation of the sliding door 20.

When the power source 32 drives the gear 34 to rotate, the gear 34 drives the rack 36 to translate along a direction of extension of the rack 36, so that the sliding door 20 where the rack 36 is installed can be driven to translate along a direction of extension of the first side 22 of the sliding door 20. When the gear 34 rotates in a clockwise direction (the direction shown in FIG. 2), the gear 34 drives the rack 36 to move leftward, and at this point, the sliding door 20 moves towards the opening 12 of the landing platform 10, until the opening 12 is blocked to close the sliding door 20. When the gear 34 rotates in a counterclockwise direction (the direction shown in FIG. 2), the gear 34 drives the rack 36 to move rightward, and at this point, the sliding door 20 moves away from the opening 12 of the landing platform 10 until the opening 12 is completely exposed to open the sliding door 20.

In this implementation mode, as the landing platform 10 and the sliding door 20 are located in two planes parallel to each other, in order to reduce a distance between the two planes where the sliding door 20 driven by the driving assembly 30 and the landing platform 10 are located as much as possible, the gear 34 is installed between the steering gear and the landing platform 10, so that the distance between the sliding door 20 where the rack 36 is installed and the landing platform 10 can be as small as possible and the sliding door 20 translates and slides in a plane as close as possible to the landing platform 10, so as to reduce the space occupied by the sliding door assembly 100 as much as possible without occupying more space in the landing platform 10, and reserve more design space for the design of other auxiliary apparatuses in the base station and the unmanned aerial vehicle.

The sliding door assembly 100 may further include a sliding assembly 40 to assist the sliding door 20 in making a translational motion. There may be many choices for the sliding assembly 40, for example, a pulley, a roller, a bearing and the like. In this implementation mode, the sliding assembly 40 includes several bearings 42. The number of the bearings 42 is four. The bearings 42 are installed to two ends of the first side 22 of the sliding door 20 and two ends of the second side 24. The landing platform 10 of the sliding door assembly 100 may also be provided thereon with two first sliding slots 44 relative to the bearings 42, wherein one of the first sliding slots 44 is disposed on an upper portion of the first side 22 of the sliding door 20, and the other one of the first sliding slots 44 is disposed on a lower portion of the second side 24 of the sliding door 20. The bearings 42 installed to the two ends of the first side 22 may be accommodated in the first sliding slot 44 on the upper end, and the bearings 42 installed to the two ends of the second side 24 may be accommodated in the first sliding slot 44 on the lower end. When the sliding door 20 translates along an extending direction of the first side 22 thereof, the bearings 42 may slide in the first sliding slot 44, so as to guide the translation of the sliding door 20.

The sliding door assembly 100 may further include cover plates 50. The number of the cover plates 50 is two, which cover the first side 22 and the second side 24 of the sliding door 20. Each of the cover plates 50 may also be provided with a second sliding slot (not shown). The positions where the bearings 42 are installed may directly face the second sliding slots of the cover plates 50. The first sliding slots 44 and the second sliding slots opposite thereto jointly accommodate the bearings 42 to guide and limit sliding of the bearings 42.

The ground base station 1 is further installed with a distance sensor (not shown) for detecting whether the sliding door 20 of the sliding door assembly 100 is opened. The distance sensor may be installed on the manipulator 300. An initial distance value is preset in the distance sensor. The distance sensor may be an infrared distance sensor, which may send a signal vertically upward, and if there is a shelter on the top, the distance sensor may receive a signal returned by the shelter, so as to determine whether the sliding door 20 is opened normally. If no signal is returned, it indicates that there is no shelter above the distance sensor and that the sliding door 20 is in an open state.

When the unmanned aerial vehicle has landed on the landing platform 10 of the ground base station 1 and the sliding door 20 of the sliding door assembly 100 needs to be opened and the manipulator 300 needs to pass through the sliding door 20 to extend out of the ground base station 1 so as to replace the battery for the unmanned aerial vehicle, and in the process that the manipulator 300 moves upward, if the distance sensor detects that the distance from the sliding door assembly 100 reaches the preset value, the distance sensor returns a result that the sliding door 20 is not opened, and thus it can be determined that the sliding door 20 in the sliding door assembly 100 is not in an normal operating state. At this point, the distance sensor sends a signal to a communication system to control the manipulator 300 to stop moving upward and return back to the initial position, and further sends a signal to the unmanned aerial vehicle to notify the unmanned aerial vehicle that the ground base station 1 is not in an normal operating state and cannot provide charging for the unmanned aerial vehicle and the like. If the unmanned aerial vehicle needs to be charged, it shall go to the next ground base station. If the distance sensor does not sense the value of the distance from the sliding door assembly 100, the distance sensor returns a result that the sliding door 20 has been properly opened, and thus it can be determined that the sliding door 20 in the sliding door assembly 100 is in a normal operating state. The manipulator 30 may continue to move upward until it reaches the position of the unmanned aerial vehicle, so as to replace the battery for the unmanned aerial vehicle.

As the sliding door assembly in the implementation mode of the present disclosure implements power transmission in a manner of a gear and a rack and also uses a bearing for side rolling, by means of the sliding door, a distance between the sliding door and the unmanned aerial vehicle is small, and the manner in which the sliding door is opened by translating in the plane is easy to use, so as to reduce the space to be occupied by the sliding door assembly as much as possible without occupying more space in the landing platform, reserve more design space for other auxiliary apparatuses in the base station, and avoid causing spatial influences on upper and lower apparatuses of the sliding door of the base station, which can enable the lower portion of the unmanned aerial vehicle to have a higher mounting capability and reduce the thickness dimension of the part of the ground base station.

The sliding door assembly in the implementation mode of the present disclosure is not limited to implement power transmission in a manner of a gear and a rack. The transmission manner of the gear and the rack may be replaced with other transmission manners having the equivalent function, for example, belt transmission, chain transmission, linkage transmission and other mechanical transmission manners, or hydraulic transmission, pneumatic transmission and other non-mechanical transmission manners.

Persons of ordinary skill in the art should realize that the above implementation modes are merely used to describe some embodiments, but are not intended to limit the present disclosure, and any proper changes and variations made to the above embodiments within the spirit and scope of the present disclosure shall fall within the scope of the present disclosure.

What is claimed is:
1. A sliding door assembly comprising:
   a landing platform located in a first plane, the landing platform including:
      a front facing outside and configured for an unmanned aerial vehicle to land on;

a back opposite to the front; and
an opening;
a sliding door mating with the landing platform and configured to cover the opening, located in a second plane approximately parallel to the first plane, and located closer to the back of the landing platform than to the front of the landing platform;
a cover plate located on the back of the landing platform and covering a side portion of the sliding door; and
a driving assembly configured to drive the sliding door to move translationally along the cover plate in the second plane to open or close the sliding door, the driving assembly including:
a power source including a steering gear;
a gear installed at the back of the landing platform, located between the back of the landing platform and the steering gear, and configured to be driven by the power source to rotate; and
a rack installed at the sliding door and meshing with the gear.

2. The sliding door assembly according to claim 1, further comprising:
a sliding assembly configured to assist the sliding door to undergo a translational motion.

3. The sliding door assembly according to claim 2, wherein the sliding assembly comprises a plurality of bearings installed at a side portion of the sliding door.

4. The sliding door assembly according to claim 3, wherein the landing platform includes a sliding slot to receive the bearings and to limit and guide sliding of the bearings in the sliding slot.

5. The sliding door assembly according to claim 1, wherein the gear is configured to drive the sliding door to translate along a direction of extension of the rack through meshing transmission with the rack to open or close the sliding door.

6. The sliding door assembly according to claim 5, wherein:
the sliding door comprises a first side and a second side which are opposite to each other,
the power source is installed on an upper end of the first side of the sliding door, and
the rack is installed on the first side of the sliding door.

7. The sliding door assembly according to claim 6, wherein the sliding door assembly further comprises bearings configured to assist the sliding door to undergo a translational motion through rolling of the bearings.

8. The sliding door assembly according to claim 7, wherein the bearings are installed at least one of: two ends of the first side of the sliding door or two ends of the second side of the sliding door.

9. The sliding door assembly according to claim 8, wherein the landing platform includes a sliding slot to receive the bearings and to limit and guide sliding of the bearing in the sliding slot.

10. The sliding door assembly according to claim 1, wherein the rack is translationally movable in the second plane relative to the landing platform.

11. A ground base station comprising:
a sliding door assembly comprising:
a landing platform located in a first plane, the landing platform including:
a front facing outside and configured for an unmanned aerial vehicle to land on;
a back opposite to the front; and
an opening;
a sliding door mating with the landing platform and configured to cover the opening, located in a second plane approximately parallel to the first plane and located closer to the back of the landing platform than to the front of the landing platform;
a cover plate located on the back of the landing platform and covering a side portion of the sliding door; and
a driving assembly configured to drive the sliding door to move translationally along the cover plate in the second plane to open or close the sliding door, the driving assembly including:
a power source including a steering gear;
a gear installed at the back of the landing platform, located between the back of the landing platform and the steering gear, and configured to be driven by the power source to rotate; and
a rack installed at the sliding door and meshing with the gear.

12. The ground base station according to claim 11, wherein the sliding door assembly further comprises a sliding assembly configured to assist the sliding door to undergo a translational motion.

13. The ground base station according to claim 12, wherein the sliding assembly comprises a plurality of bearings installed at a side portion of the sliding door.

14. The ground base station according to claim 13, wherein the landing platform includes a sliding slot to receive the bearings and to limit and guide sliding of the bearings in the sliding slot.

15. The ground base station according to claim 11, further comprising:
a manipulator; and
a receiving cavity for receiving a battery or fuel.

16. The ground base station according to claim 15, wherein the manipulator includes a distance sensor configured to sense whether the sliding door in the sliding door assembly is opened to determine whether the sliding door assembly is in a normal state.

* * * * *